United States Patent [19]

Broussaud

[11] 4,365,863

[45] Dec. 28, 1982

[54] OPTICAL SWITCH FOR A VERY LARGE NUMBER OF CHANNELS

[75] Inventor: Georges J. G. Broussaud, Colombes, France

[73] Assignee: Le Materiel Telephonique Thomson-CSF, Colombes, France

[21] Appl. No.: 154,298

[22] Filed: May 29, 1980

[30] Foreign Application Priority Data

May 30, 1979 [FR] France .................................. 79 13766

[51] Int. Cl.³ ............................................ H04B 9/00
[52] U.S. Cl. ............................ 350/96.15; 350/96.19; 370/1; 455/612
[58] Field of Search ............... 350/96.15, 96.16, 96.17, 350/96.18, 96.19, 96.20, 3.73, 3.74, 3.75; 179/1 C, 1 SW; 370/1, 2, 3, 4; 455/600, 601, 612, 613

[56] References Cited

U.S. PATENT DOCUMENTS

| | | | |
|---|---|---|---|
| 3,831,035 | 8/1974 | Hill | 350/3.74 X |
| 3,912,867 | 10/1975 | Goeller | 179/1 CN |
| 4,011,543 | 3/1977 | Soref et al. | 455/612 X |
| 4,065,644 | 12/1977 | Shinosky, Jr. | 370/1 X |
| 4,256,927 | 3/1981 | Treheux et al. | 455/612 X |

FOREIGN PATENT DOCUMENTS 54-122134  9/1979  Japan ................................. 350/96.15

*Primary Examiner*—John D. Lee
*Attorney, Agent, or Firm*—Oblon, Fisher, Spivak, McClelland & Maier

[57] ABSTRACT

An optical switching system comprising two optical fiber arrays 4 and 5 facing one another. In the space between these two arrays, a propagation mode converter 6 or 7, deflector 9 or 11, a deflector control device 13 or 14 and control logic 15 or 16 controlled by a processor 19 are placed for each fiber.

7 Claims, 3 Drawing Figures

OPTICAL SWITCH FOR A VERY LARGE NUMBER OF CHANNELS

BACKGROUND OF THE INVENTION

1. Field of the Invention

The present invention relates to an optical switch for a very large number of channels, especially for switching the channels of a telephone exchange.

2. Description of the Prior Art

The switching systems presently used in telephone exchanges are either electromechanical or electronic, but even in the case of electronic exchanges, the size of the switch must be increased in order to obtain a very large number of switching possibilities, which is not always desirable.

In addition, because of the likely decrease in natural copper sources and the ever increasing requirement for data transmission channels, the manufacturers of data transmission lines have been prompted to envisage the use of an optical carrier guided by a glass filament, this solution appearing to be the most promising at the present time.

Many of the components for constituting an optical network, such as low-loss glass filaments, sources, detectors, couplers, modulators, deflectors, etc., are already in an advanced stage of development. On the other hand, the switching systems, which nevertheless constitute one of the essential parts of a telecommunications network, are presently at the very beginning of their development and their performance characteristics are far from reaching those of electronic switching systems.

SUMMARY OF THE INVENTION

The subject of the present invention is an optical switching system for switching a very large number of channels and possessing switching characteristics comparable or better than those of an electronic switch, while being smaller in size for the same capacity.

The optical switch in accordance with the present invention can connect any optical fiber of the N fibers of the first group to any optical fiber of N fibers of a second group, the ends of the optical fibers, for example glass filaments, of each of these two groups being preferably coplanar and arranged in an array, the two arrays constituted in this manner facing one another at a distance preferably of the order of 1 to 2 meters, the space between the two arrays containing an optical switching system comprising a propagation mode converter associated with each fiber of each array, a deflector and its control interface associated with each fiber of at least one of the two arrays, a required channel address detection device and, associated with one or several deflectors, a logic circuit controlling said control interface, said logic circuits and said address detection devices operating with a processor.

BRIEF DESCRIPTION OF THE DRAWINGS

The present invention may be more clearly understood from the detailed description of a non-limiting illustrative embodiment illustrated by the appended drawing in which.

DETAILED DESCRIPTION OF THE PREFERRED EMBODIMENTS

Figure 1:
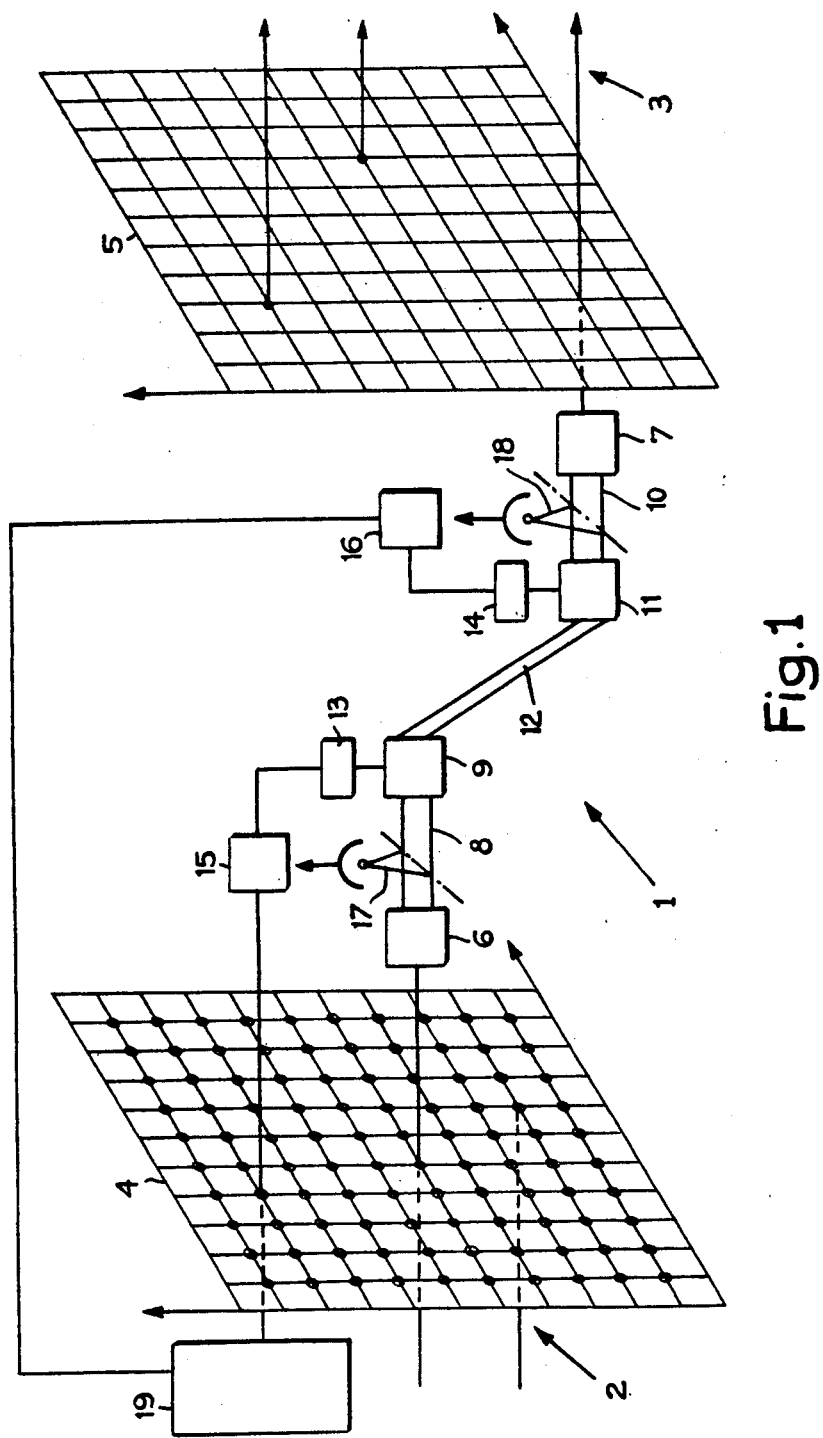
FIG. 1 is a schematic view of a switching system in accordance with the present invention.

The optical switching system 1 schematically shown in FIG. 1 is the switching network of, for example, a 10,000-channel telephone exchange, but it should be clearly understood that the invention is not limited to the application of the switching system to a telephone exchange.

Switch 1 is connected between the end of a first array 2 of N optical fibers and the end of a second array 3 of N optical fibers, these optical fibers being, for example, glass filaments, of which only a few are represented in order to clarify the drawing. It is not necessary, however, that the two arrays comprise the same number of glass filaments.

In the illustrative embodiment shown in FIG. 1, the ends of the glass filaments in a given array are coplanar, but in certain cases, these ends may be arranged in several planes. In addition, all the glass filament ends of each array are placed regularly in rows and columns, being held by appropriate means in order to constitute fictive arrays 4 and 5 in which each fiber end can be easily identified by its coordinates, the two arrays determined in this manner being parallel one with another and opposite one another at a distance of 1 to 2 meters. The ends of the various fibers of each array are held in position by any appropriate means such as, for example, a plate perforated to ensure the required array geometry, the different fibers being inserted through the perforations. It is assumed that the light signal is switched from array 2 to array 3.

A mode converter is provided opposite the end of each fiber of array 2, a single mode converter 6 being shown to avoid complicating the drawing, and a mode converter is placed opposite the end of each fiber of array 3, such as converter 7, which is the only converter shown for the sake of clarity.

The mode converters, such as 6 and 7, are known devices capable of converting from the guided mode of propagation in glass filaments to a directive mode of propagation in free space, i.e. by a beam of light, and vice-versa. In its simplest form, such a converter comprises essentially an optical lens whose focal point is positioned at the end of the corresponding fiber. In order to minimize the size of the switching system while requiring a sufficiently small angle of divergence of the resulting beams of light, the optical converters are designed such that the diameter of said beams of light is 1 to 2 mm, for example, for an optical wavelength of approximately 1 micron (10,000 Å).

Figure 2:
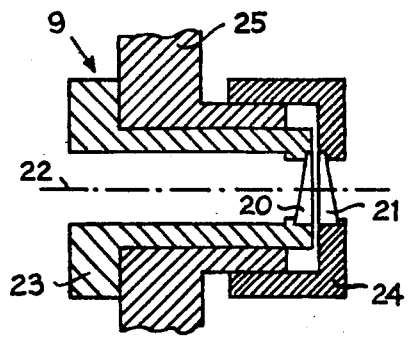
FIG. 2 is a schematic sectional view of a deflector device which may be used in the switch shown in FIG. 1.

Each mode converter, such as 6, sends a beam of light such as 8 to a deflector such as 9, and each mode converter such as 7 receives a beam of light such as 10 from a deflector such as 11. Deflectors such as 9 and 11 may be light-beam deflectors of any known type. An example of a practical light deflector is illustrated by FIG. 2 and is described in detail below. In the example shown in FIG. 1, the deflector 9 deflects the beam of light 8 to become beam 12 onto the deflector 11, which deflects it again to the converter 7, this beam of light between 11 and 7 being identified by the reference 10 as indicated above.

Each deflector, such as 9 and 11, is controlled by an interface control device such as 13 and 14 respectively, this control device being itself driven by a logic circuit such as 15 and 16 respectively. However, a single logic circuit such as 15 or 16, and even a single control device such as 13 or 14, may be associated with several deflectors such as 9 or 11. A detector such as 17 is associated with each beam of light such as 8, and its purpose is to extract from the signal carried by the beam 8 the data corresponding to the address of the required channel of array 3, i.e. in the case shown in FIG. 1, the address of deflector 11. If the switching system is of the bothway type, i.e. if the called channel can just as well belong to the array 2 as the array 3, a detector such as 18, similar to detector 17, is associated with each beam of light such as 10. The logic circuits 15 and 16 are connected to a central processor 19 which, together with these logic circuits, controls all the switching system functions. This processor may be that of the exchange or a processor specially assigned to the switching system.

Each detector, such as 17 or 18, may, for example, comprise a semi-transparent mirror sampling the corresponding beam of light, an optoelectronic device for converting the sample of the beam of light into an electrical signal, and a device for decoding this electrical signal in order to extract the address data. The decoding device may be a distinct subassembly connected to the corresponding logic circuit or directly to the processor 19, or may be integral with said logic circuit or processor 19.

The deflection device 9 (or 11), shown by the highly enlarged drawing in FIG. 2, operates on the principle of the diasporameter and comprises essentially two identical prisms 20 and 21 placed back-to-back at a small distance one from the other and capable of rotating about the same line 22 perpendicular to their two facing surfaces. The theory of the diasporameter is well known and is not explained below. Prisms 20 and 21 are installed in rings 23 and 24 centered on line 22, these rings being carried by a common support 25 of which the part relating to deflector 9 only has been shown, this support 25 being common to all deflectors such as 9 (or 11). The relative positions of the deflectors on their common support 25 is naturally the same as those of the corresponding fiber ends, i.e. constituting an array. Rings 23 and 24 are rotated either by individual motors (not shown) allowing accurate angular positioning, such as stepping motors, or by extremely accurate clutch devices capable of coupling the rings as required to the shaft of a single continuously rotating motor, as in the "Rotary" system. Since the prisms are identical and placed symmetrically with respect to their plane of separation, it is possible to orient prism 20 as well as prism 21 to the corresponding mode converter. In certain applications, one of the two prisms may be fixed and the other rotating.

It should be clearly understood, however, that the diasporameter type of deflector is not the only one which may be used, and it is possible to adopt any other type of deflector allowing the accurate deflection of a beam of light in a large number of directions, while being small in size. In the case of one-way switching systems, deflection-receive devices such as 11, together with their control devices such as 14 and 16, may be replaced by simple omnidirectional passive receivers.

At the end of a communication established between a channel of array 2 and a channel of array 3 by the corresponding deflectors, the latter return to a rest or neutral position for which no communication is established, this position being determined either mechanically (for example by means of a retractable stop), or electrically or electronically, depending on the type of deflector used.

The present invention makes it possible to produce a very high-capacity switching system of very small size, since as indicated above, the beams of light propagating between the mode converters and deflectors have a diameter of the order of 1 millimeter. The mode converters may also have a diameter of the same order, and it is possible to manufacture diasporameter deflectors having a cross-section of approximately 1 cm$^2$. It is thus possible to place several thousand fibers in an array having an area of 1 m$^2$, the distance between the arrays 4 and 5 being 1 to 2 meters.

When using mechanical deflectors, it is not possible to perform space-time multiplexing because of their relatively long response time. If such multiplexing is required, non-mechanical types of deflectors must be used, such as acousto-optical deflectors based on photon-phonon interaction within a crystal medium. Extremely high performance has been obtained with a block of lead molybdate excited by a lithium niobiate transducer. It is possible to obtain 150 independently deflected beams of light with an optical efficiency exceeding 90%. In the case considered herein of a cartesian xy array, two such deflectors must be placed in a cross configuration. The overall efficiency of approximately 81% is still acceptable, but with present technology the dimensions of the switching system are greater than in the case of diasporameter deflectors. The size of an acousto-optical deflector system may be reduced by arranging the channels in a linear configuration. By relating the geometry of the materials constituting deflectors to this linear configuration, it is possible to obtain up to 1200 independent beams of light for the same block with an optical efficiency of more than 60%, which is still acceptable.

Figure 3:
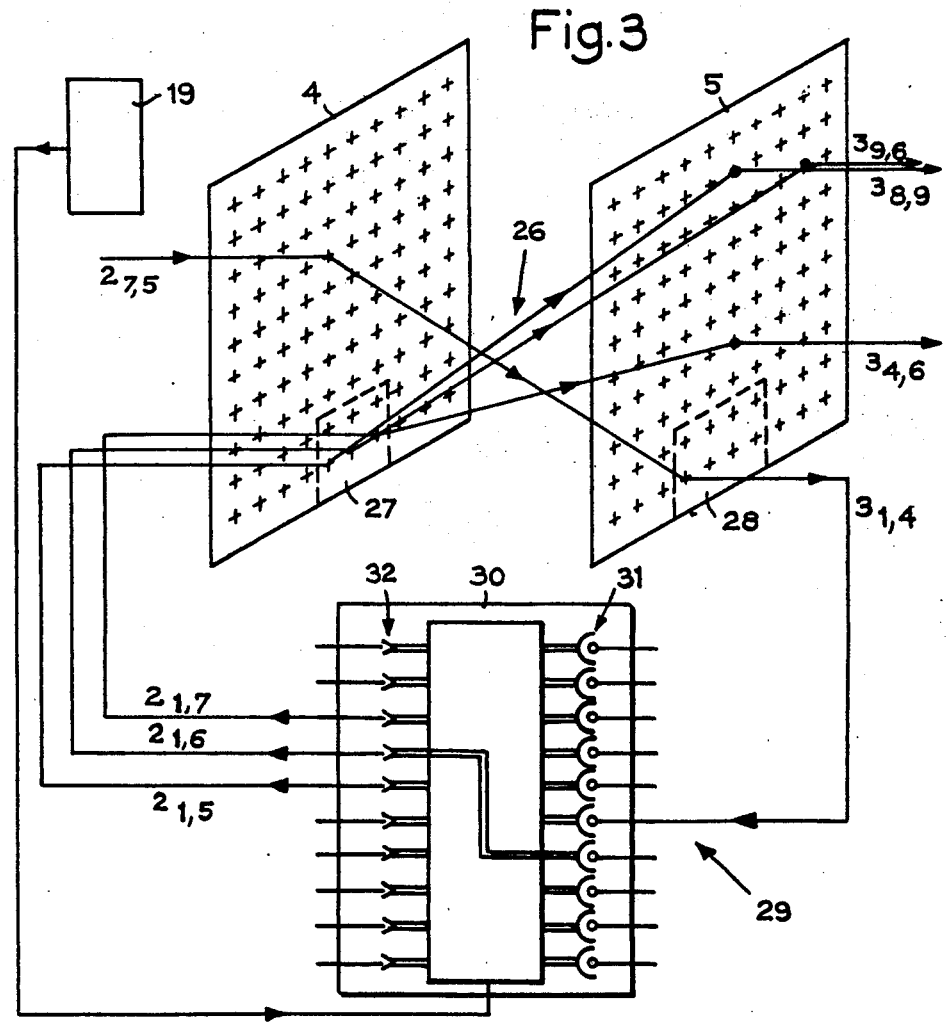
FIG. 3 is a schematic view of an improvement of the switching system shown in FIG. 1.

A practical form of the switching system in accordance with the invention for simultaneously establishing several communications between several subscribers, such as for a telephone conference, is shown in a highly schematical manner in FIG. 3. The switching system shown in FIG. 3 comprises in the space between arrays 4 and 5 the same elements 6 to 18 as the switching system shown in FIG. 1, and these elements have not been drawn in FIG. 3. The optical switching function has been simply symbolized by a few straight lines 26.

Certain areas of the arrays 4 and 5, for example areas 27 and 28 respectively, are assigned to looped connections 29. The ends of the corresponding groups of fibers are symbolized by crosses in arrays 4 and 5 arranged in a cartesian configuration of, for example, ten rows and ten columns. The fibers of corresponding channels of arrays 2 and 3 are numbered 2 and 3 respectively with a two-digit suffix, the first digit corresponding to the column and the second to the row.

Consider, for example, fiber $2_{7,5}$, which is optically switched to fiber $3_{1,4}$ located in area 28. This fiber $3_{1,4}$, as are all the fibers in area 28, is connected to the input of a switching network 30 whose outputs are connected to fibers in the area 27. In order to simplify the drawing, only three of these fibers in area 27 are shown, i.e. fibers $2_{1,7}$, $2_{1,6}$ and $2_{1,5}$, which are optically switched to fibers $3_{4,6}$, $3_{8,9}$ and $3_{9,6}$ respectively. Subscribers whose telephone sets are connected to fibers $2_{7,5}$, $3_{4,6}$, $3_{8,9}$ and $3_{9,6}$ can participate simultaneously in a conference call. In the example shown, the switching network 30 comprises essentially on its input side devices 31, such as diodes providing optical-to-electrical conversion, and on its output side devices 32, such as diodes providing electrical-to-optical conversion, and the switching between the two types of conversion device being performed electrically in a known manner under the control of processor 19. Since network 30 establishes the connection between at least one input fiber and several output fibers, it is preferable to use electrical switching as described above to avoid dividing the incident light level. Nevertheless, network 30 could also provide purely optical switching. It should be noted that the switching system shown in FIG. 3 allows the space-division of a time-division multiplexed incident signal.

What is claimed is:

1. A bidirectional optical switching system for selectively interconnecting a first group of optical fibers and a second group of optical fibers, the ends of the fibers in each group being coplanar and arranged in an array, the two arrays facing one another and having a space therebetween, said bidirectional optical switching system comprising:
    a plurality of propagation mode converters, with one converter being associated with each fiber of each array, for receiving the optical signal from the associated fiber and producing an output optical signal;
    a plurality of deflectors with one deflector being associated with each propagation mode converter, for receiving the output signal from the associated propagation mode converter;
    at least one control interface being associated with at least one deflector, for controlling the associated deflector;
    at least one logic circuit, with each logic circuit being associated with at least one control interface, for driving the associated control interface;
    a plurality of address detectors, with one address detector being associated with each propagation mode converter and each of said detectors located between each associated mode converter and each said mode converters associated with one of said deflectors, said address detectors extracting address data from said output optical signal and controlling said logic circuit in response thereto, so that said control interface causes said deflector to switch the output optical signal to a desired optical fiber of the opposite array.

2. An optical switching system in accordance with claim 1, wherein said propagation mode converter comprises an optical lens whose focal point is placed on the end of the corresponding fiber.

3. An optical switching system in accordance with claims 2 or 1, wherein said deflector is of the diasporameter type.

4. An optical switching system in accordance with claim 2 or 1, wherein said address detector comprises a semi-transparent mirror, an optoelectronic conversion device and an address decoding device.

5. An optical switching system in accordance with claims 2 or 1 for simultaneously establishing several communications between several channels, wherein certain fibers of said arrays are assigned to looped connections, and wherein these looped connections comprise a switching network.

6. An optical switching system in accordance with claim 5, wherein said switching array comprises on its input side diodes providing optical-to-electrical conversion and on its output side diodes providing electronic-to-optical conversion, and wherein the switching between the two types of conversion devices is performed electrically.

7. An optical switching system in accordance with claim 5, wherein a time-division multiplexed incident signal is used for performing the space-division multiplexing.

* * * * *